April 12, 1960   V. C. KENNEDY, JR   2,932,188
WEIGHT AND CENTER OF GRAVITY COMPUTING APPARATUS
Filed Feb. 21, 1955
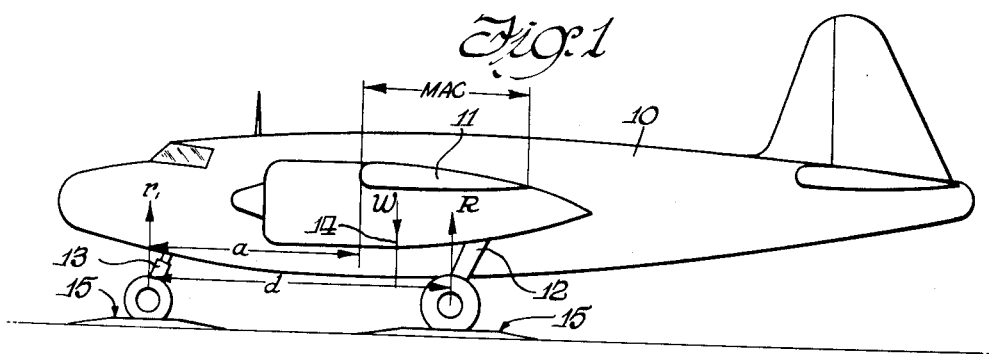
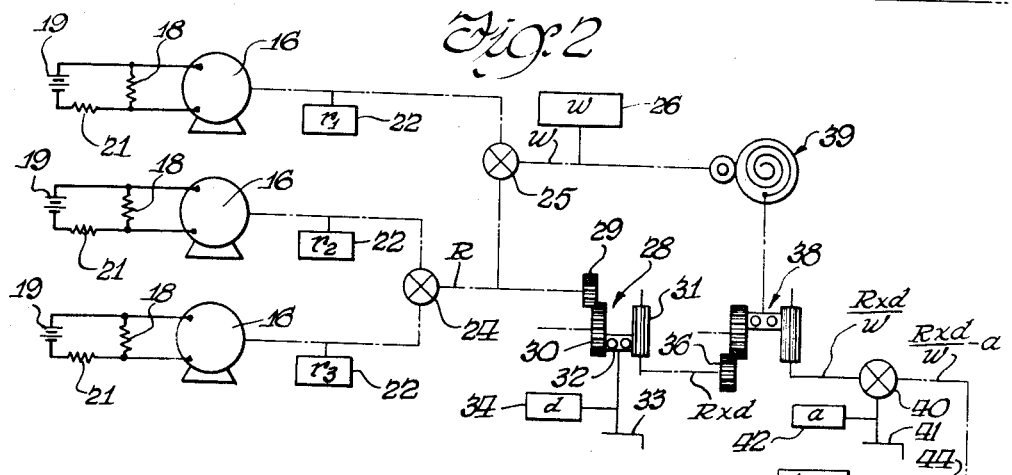
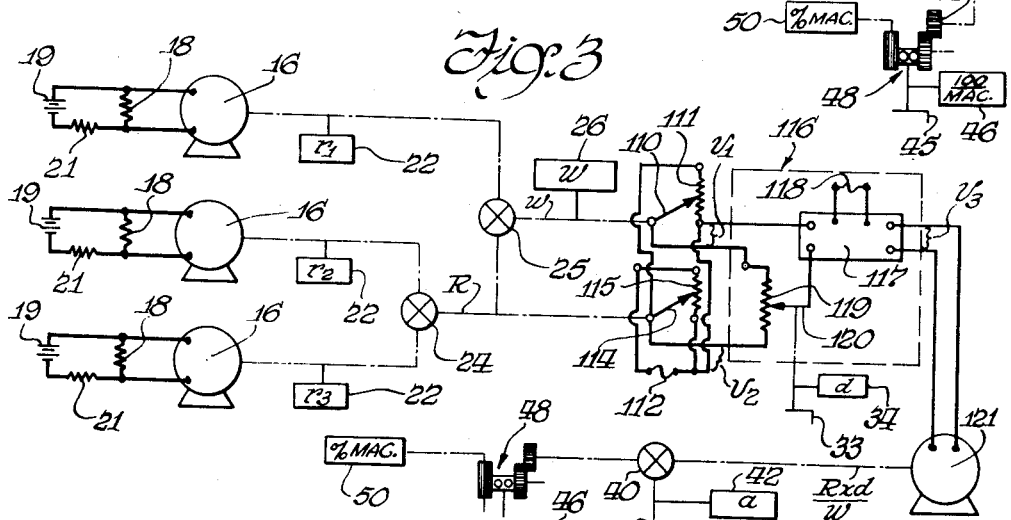
Inventor
Verne C. Kennedy, Jr.
by Bair, Freeman & Molinare
Attorneys United States Patent Office 2,932,188
Patented Apr. 12, 1960

2,932,188

WEIGHT AND CENTER OF GRAVITY COMPUTING APPARATUS

Verne C. Kennedy, Jr., Chicago, Ill., assignor to Streeter-Amet Company, Chicago, Ill., a corporation of Illinois Application February 21, 1955, Serial No. 489,542

6 Claims. (Cl. 73—65)

This invention relates to weight and center of gravity computing apparatus of the type used to produce an accurate measurement and indication of the total weight and the position of the center of gravity of objects of various types.

The invention is particularly applicable to a determination of the weight and center of gravity of fluid supported devices such as aircraft, or watercraft, or projectiles traveling through air or water. Although the invention is particularly described in connection with aircraft, it will be apparent that the description is equally applicable to many other types of devices and that aircraft are selected only as an example of the types of objects with which the apparatus of the invention can be used.

It has been proposed heretofore to provide a mechanism, either built in as a part of an aircraft or as a separate mechanism to support an aircraft, for determining the total weight and fore and aft position of the center of gravity of the aircraft. Such devices have been either very complicated and expensive to build or have been complicated and slow to operate.

It is one of the objects of the present invention to provide a weight and center of gravity computing apparatus which is relatively simple in its construction and which is easy and rapid in its operation.

Another object is to provide a computing apparatus which can be used with any size or type of object to determine its weight and center of gravity position.

Still another object is to provide a computing apparatus in which the readings of the necessary values can be taken easily and quickly and set in the mechanism so that computation of the center of gravity can be completed at a later time if desirable.

A further object is to provide a computing apparatus in which certain constants, characteristic of the geometry of the particular object to be weighed, may be pre-set in the apparatus so that no manual operations are required when the device is in operation, permitting a substantially immediate reading of the desired values to be obtained.

A still further object is to provide a computing apparatus utilizing reliable and accurate mechanical components which permit measurements of high precision to be achieved, but which may, if preferred, be replaced in part by equivalent electrical circuits.

Another object is to provide a computing apparatus which produces an automatic presentation of the weight carried by each individual support point, the total weight of the object, and, when employed as a means for determining center of gravity of aircraft, the value thereof in terms of percent mean aerodynamic chord.

The above and other objects and advantages of the invention will be more readily apparent from the following description when read in connection with the accompanying drawing, in which—

Figure 1 is a side elevation illustrating the manner of weighing and computing the center of gravity of an aircraft with an apparatus embodying the invention, showing certain dimensions and force vectors thereon which are pertinent to the present computation technique.

Figure 2 is a schematic lay-out showing the various components of a mechanical device embodying the invention.

Figure 3 is a schematic lay-out similar to Figure 2, showing a modified form of computing apparatus similar to the mechanical apparatus of Figure 2, but having provision for partial computation by electrical analog techniques.

The apparatus as illustrated in Figure 1 is used to obtain the total weight and to compute the fore and aft position of the center of gravity of a conventional aircraft. As shown, the aircraft comprises a main fuselage 10 having wings 11 projecting from the sides thereof and a conventional tri-cycle landing gear including a pair of main wheel units 12 and a nose wheel unit 13. Two landing wheel units 12 are provided lying to the rear of the center of gravity, as indicated at 14, and a single nose wheel unit 13 is provided well forward of the center of gravity. For many types of service it is desirable to obtain an indication of the total weight of the aircraft when loaded and of the position of its center of gravity under load conditions.

For this purpose a plurality of weight supporting devices indicated generally at 15 are provided. The weight supporting devices 15 are preferably separate units which can be positioned on a floor or run-way to receive and support the several landing gear units of the aircraft. For an aircraft of the type shown, three such units would be required to support the two rear landing wheels and the nose wheel. Each of the units 15 may be of the type described in the co-pending application of James E. Quinn, Serial Number 311,931, filed September 27, 1950, now patent No. 2,735,291, issued February 21, 1956, wherein the platform on which the landing wheel can rest is supported by a plurality of electrical load cells which preferably comprise standard strain gauge units whose resistance changes with changes in the load thereon and which may be connected in suitable circuits to produce a voltage change in response to load as desired.

The electronic scale units each provide one input for actuating the computer system, shown in schematic lay-out in Figure 2. A standard servo device 16 of the type generally used for transmitting a mechanical actuating movement is arranged to receive the output of each of the scale units. The load cells or strain gauges 18 are connected with sources of voltage 19, with resistors 21 in series therewith to produce changes in voltage across the strain gauge resistors as the load varies. Such a circuit is a typical example of a suitable arrangement, although it will be apparent that the strain gauges could be included in bridge circuits or any other types of circuits which produce a voltage change in response to load.

The movements generated by the servomechanisms 16 actuate conventional mechanical registers or counters 22 which have individual reactions to each of the servos 16. The servos 16 and the registers 22 are properly coupled and calibrated so that the registers will indicate directly in pounds or tons the weight carried by each wheel. For purposes of illustration, $r_1$ is the reading of the weight carried by the nose wheel 13, and $r_2$ and $r_3$ indicate the respective loads carried by rear wheels 12.

A conventional differential 24, of the type used to add mechanical servo outputs, is provided to combine the movements corresponding to the weights carried by the rear wheels 12 into a single output R. A second differential 25 is arranged to receive the outputs $r_1$ and R, and combine them to provide a single output W corresponding to the total weight carried by the wheels. A register 26 is provided to record the total weight directly in pounds or tons, consistent with the units already chosen for registers 22.

The output movement R further serves to actuate the drive of a mechanical multiplier 28. The multiplier is of the conventional type used to multiply two servo outputs, and comprises a drive gear 29, and a pair of intersecting axis gears 30 and 31 having a combined drive coupling and ratio adjustment 32. A manual control 33 for the adjustment 32 is set to the desired value of $d$, which represents the linear distance in inches or feet, as chosen, corresponding to the particular aircraft being weighed. This value of $d$ is generally known prior to the actual weighing operation, and may be conveniently pre-set by the operator. Setting of the manual control 33 effects a positioning of the ratio adjustment 32, and produces a reading of the value of $d$ on a register 34. The position of the ratio adjustment 32 determines the multiplication factor between the intersecting axis gears 30 and 31. Actuation of the drive gear 29 by the servo movement R results in multiplication with the pre-set value $d$ to produce an output equal to R times $d$. The output $R \times d$ effects the rotation of a drive gear 36 of a second multiplier 38.

The output movement W is transmitted through a reciprocal cam 39 to the multiplier 38. The cam 39 changes the factor of W to a value of $1/W$. The output movement $1/W$ is arranged to effect a positioning of the ratio adjustment of multiplier 38. Actuation of the drive gear 36 by the servo movement $R \times d$ results in multiplication with the setting corresponding to $1/W$ to produce an output equal to $R \times d/W$. A differential 40 is provided to receive the output from multiplier 38 and a second input equal to the linear distance, in feet or inches consistent with the units of $d$, from the vertical axis through the center point of the nose wheel 13 to the vertical axis tangent to the leading edge of the mean aerodynamic chord. This value, $a$, is a known constant corresponding to the characteristics of the particular aircraft being weighed and may be conveniently pre-set by the operator prior to the weighing operation. A manual input 41 is provided for introducing the value of $a$, and a register 42 is arranged to indicate the setting in the appropriate chosen units. The differential 40 serves to subtract the input value of $a$ from the value of $R \times d/W$ to produce a single output value equal to $R \times d/W - a$.

The output from the differential 40 serves to actuate a drive gear 44 of a multiplier 48. A manual control 45 permits the ratio adjustment of the multiplier to be pre-set to a value corresponding to 100/M.A.C., which is a constant determined by the characteristics of the aircraft being weighed and may be conveniently introduced prior to the weighing operation. A register 46 is provided to indicate the setting of the manual input. Actuation of the drive gear 44 results in a multiplication which produces an output equal to the value of % M.A.C. A register 50 receives the output of multiplier 48 and provides a reading of the final desired value.

In determining the total weight of the aircraft, it will be apparent that the register 26 will provide an automatic and immediate reading of the desired value. The weight, as indicated in Figure 1, may be considered to be proportional to a force W acting downwardly at the center of gravity of the aircraft. This force is counter-balanced by forces $r_1$ and the sum of $r_2$ and $r_3$, or R, acting upwardly at the positions of the landing gear elements and spaced apart a distance $d$. Since the total weight as indicated by Figure 1 is the summation of the supporting forces of the wheels 12 and 13, the mechanical summation of R and $r_1$ provides the desired value of total weight W.

In order to locate the center of gravity, it is necessary to take a balance of the force moments acting upon the aircraft when it is in static equilibrium. If the vertical axis through the nose wheel is selected as a reference datum line, then the upward moments about the datum are equal to R times $d$, and the downward moments are equal to W times the force arm determined by the distance from the datum to the center of gravity, which force arm is equal to the distance from the datum to the leading edge of the mean aerodynamic chord plus the distance from the M.A.C. to the center of gravity. Since it is desirable to express the location of the center of gravity in terms of a percentage of the M.A.C., it will be apparent from the foregoing that the following formula may be used to calculate % M.A.C.: $(R \times d/W - a)$ 100/M.A.C. The apparatus described above performs the necessary calculation in accordance with the foregoing formula and provides a direct reading of the desired % M.A.C. value at register 50. In practice, the operator will manually pre-set the known values of $d$, $a$, and 100/M.A.C. which are determined by the characteristics of the particular aircraft being weighed. These settings may be performed prior to the weighing operation. The aircraft may then be rolled onto the weight supporting devices 15, and a reading of the total weight and % M.A.C. immediately obtained. The aircraft need not remain on the scales for any extended period of time, and may be removed at once.

In Figure 3 of the drawing I have illustrated a modification of the present invention, wherein provision is made of partial computation of the desired calculations by electrical analog techniques. Identical parts have been given the same numbers as those appearing in Figure 2. The apparatus of Figure 3 provides two output servo movements equivalent to W, the total weight, and R, the weight on the rear wheels 12, in the same manner as the apparatus of Figure 2. The modification differs only in the manner by which the value of $R \times d/W$ is obtained.

The mechanical output W of Figure 3 operates to effect the positioning of a wiper 110 along a resistor 111 in an electrical circuit having a source of electrical energy 112, connected between one terminal of potentiometer resistance 111 and a terminal of potentiometer resistance 115. In like manner, the mechanical output R effects the positioning of a wiper 114 along a resistor 115 in the same circuit. In this manner the mechanical forces are transformed into two voltage drops $V_1$ and $V_2$ which are proportional to the values of W and R, respectively.

Within the box defined by dotted lines in Figure 3, I have shown schematically a computer 116 comprising an amplifier 117, having a source of power 118, and a resistor 119 having a manually positioned wiper 120. The wiper 120 is set in accordance with the known value of $d$, whereby the voltages $V_1$ and $V_2$ are balanced so as to provide a voltage input to the amplifier which is proportional to $R \times d/W$. It is well understood by those skilled in the art that several potentiometers may be electrically interconnected to provide an output voltage which is representative of the product or quotient of the voltages existing at the wipers of the several potentiometers. Multiplying and dividing circuits of this general type have been known for many years, as shown for example, by the circuits shown in the patents to Berry, 2,540,807 and Kolisch, 2,686,634. In the embodiment of the invention shown in Figure 3, the potentiometer resistance 115 is connected across the electrical energy source 112. Potentiometer resistance 111 is connected between the wiper 114 of resistance 115 and a terminal of resistance 115. Wiper 110 of resistance 111 is moved by the mechanical output W such that the voltage existing between wipers 110 and 114 is proportional to the value $R/W$. Potentiometer resistance 119 is connected between wipers 110 and 114, and consequently, when the wiper 119 is adjusted in accordance with the known value of $d$, the voltage output to the amplifier 117 is proportional to the value $R \times d/W$. This latter voltage is amplified and introduced as $V_3$ to a servomotor 121, similar to those shown at 16, which serves to provide a mechanical output proportional to the input voltage. This output is the same as that delivered by multiplier 38 of the apparatus shown in Figure 2. The remaining components are identical to those of Figure 2 and are indicated by the same reference numerals.

It will be apparent that with the apparatus of the present invention computations of the total weight and the center of gravity position, in terms of percent mean aerodynamic chord, of many different types of aircraft may be attained rapidly and with a high degree of accuracy. The present apparatus avoids the necessity for empirical calibration for each specific type of aircraft. The only manual operations which need be performed are in the nature of pre-set constants for the particular aircraft being weighed, thereby permitting extremely rapid operations on a number of aircraft of the same type. The rapid nature of the computation technique, and the use of registers and pre-set constants, permits each calculation to be performed without necessity for causing the aircraft to remain on the weight supporting device during the calculation period.

While two embodiments of the present invention have been shown and described in detail, it will be understood that such showings are for the purpose of illustration only and are not to be taken as a definition of the scope of the invention, reference being had for this purpose to the appended claims.

I claim:

1. A weight and center of gravity computing apparatus comprising a plurality of weight supporting devices adapted to engage and support spaced points on an object whose weight and center of gravity are to be determined, each of said weight supporting devices being operative to produce electrical voltages proportional to the weight supported thereby, a movement producing device associated with each weight supporting device to receive said electrical voltage and produce a mechanical movement proportional thereto, mechanical means for adding said movements, means coupled to said mechanical means for obtaining the reciprocal of the added movements, means for multiplying the reciprocal of said added movements by predetermined constants and by the sum of predetermined ones of said movements to obtain a final calculated value, and indicator means to register a numerical reading of the summation of said added movements and to indicate said final calculated value.

2. A weight and center of gravity computing apparatus comprising a plurality of weight supporting devices adapted to engage and support spaced points on an object whose weight and center of gravity are to be determined, each of said weight supporting devices being operative to produce electrical voltages proportional to the weight supported thereby, a movement producing device associated with each weight supporting device to receive said electrical voltage and produce a mechanical movement proportional thereto, mechanical means for adding said movements, said adding means comprising a plurality of mechanical differentials to receive said mechanical forces and produce an output movement equal to the sum thereof and proportional to the total weight supported by said weight supporting device, indicator means connected to said output movement to register a response proportional thereto, means coupled to said mechanical means for obtaining the reciprocal of the added movements, means for multiplying the reciprocal of said added movements by predetermined constants, and by the sum of predetermined ones of said movements to obtain a final calculated value, and indicator means to register a numerical reading of the summation of said added movements and to indicate said final calculated value.

3. A weight and center of gravity computing apparatus comprising a plurality of weight supporting devices adapted to engage and support spaced points on an object whose weight and center of gravity are to be determined, each of said weight supporting devices being operative to produce electrical voltages proportional to the weight supported thereby, a movement producing device associated with each weight supporting device to receive said electrical voltage and produce a mechanical movement proportional thereto, mechanical means for adding said movements, means coupled to said mechanical means for obtaining the reciprocal of the added movements, means for multiplying the reciprocal of said added movements by predetermined constants, and by the sum of predetermined ones of said movements to obtain a final calculated value, said multiplying means being adjustable for introduction of said predetermined constants prior to the calculating operation whereby computation may be effected fully automatically upon actuation of said weight supporting devices, and indicator means connected to the output of said multiplying means to register said final calculated value.

4. A weight and center of gravity computing apparatus comprising a plurality of weight supporting devices adapted to engage and support spaced points on an object whose weight and center of gravity are to be determined, each of said weight supporting devices being operative to produce electrical voltages proportional to the weight supported thereby, a movement producing device associated with each weight supporting device to receive said electrical voltage and produce a mechanical movement proportional thereto, mechanical means for adding said movements, said adding means comprising a plurality of mechanical differentials to receive said mechanical movements and produce an output movement equal to the sum thereof and proportional to the total weight supported by said weight supporting device, indicator means connected to said output movement to register a response proportional thereto, means coupled to said mechanical means for obtaining the reciprocal of the added movements, means for multiplying the reciprocal of said added movements by predetermined constants and by the sum of predetermined ones of said movements to obtain a final calculated value, said multiplying means being adjustable for introduction of said predetermined constants prior to the calculating operation whereby computation may be effected fully automatically upon actuation of said weight supporting devices and indicator means connected to the output of said multiplying means to register said final calculated value.

5. A weight and center of gravity computing apparatus comprising a plurality of weight supporting devices adapted to engage and support spaced points on an object, whose weight and center of gravity are to be determined, each of said weight supporting devices being operative to produce electrical voltages proportional to the weight supported thereby, a movement producing device associated with each weight supporting device to receive said electrical voltage and produce a mechanical movement proportional thereto, mechanical means for adding said movements, means coupled to said mechanical means for obtaining the reciprocal of the added movements, means for multiplying the reciprocal of said added movements by predetermined constants and by the sum of predetermined ones of said movements to obtain a final calculated value, said multiplying means comprising a plurality of mechanical multiplication units, one of said units being adjustable in accordance with the distance between said spaced points on the object.

6. A weight and center of gravity computing apparatus comprising a plurality of weight supporting devices adapted to engage and support spaced points on an object whose weight and center of gravity are to be determined, each of said weight supporting devices being operative to produce electrical voltages proportional to the weight supported thereby, a movement producing device associated with each weight supporting device to receive said electrical voltage and produce a mechanical movement proportional thereto, mechanical means for adding said movements, means coupled to said mechanical means for obtaining the reciprocal of the added movements, means for multiplying the reciprocal of said added movements by a predetermined constant and by the sum of predetermined ones of said movements to obtain a final calculated value, said multiplying means including an electrical computing circuit, the sum of predetermined ones of said movements acting to introduce a first voltage in said computing circuit proportional thereto, said added movements acting to introduce a second voltage in said circuit proportional to the product of the reciprocal of said added movements and said sum of predetermined ones of said movements, and said predetermined constant acting to introduce a third voltage in said circuit proportional to the product of the value represented by said second voltage and said constant, a movement producing device associated with said computing circuit to receive an electrical output voltage proportional to said third voltage and to produce a mechanical proportional thereto, and a mechanical multiplication unit adjustable in accordance with a predetermined constant.

References Cited in the file of this patent

UNITED STATES PATENTS

| | | |
|---|---|---|
| 2,443,098 | Dean | June 8, 1948 |
| 2,453,607 | Wardle et al. | Nov. 9, 1948 |
| 2,520,428 | Nilakantan | Aug. 29, 1950 |
| 2,540,807 | Berry | Feb. 6, 1951 |
| 2,559,718 | Goodlett et al. | July 10, 1951 |
| 2,615,330 | Blackman et al. | Oct. 28, 1952 |
| 2,686,426 | Kolisch | Aug. 17, 1954 |
| 2,686,634 | Kolisch | Aug. 17, 1954 |

OTHER REFERENCES

"Mechanical Computing Mechanisms—I" (Reid et al.), Product Engineering, August 1949 (page 122 relied on).

"Analog Methods in Computation and Simulation" (Soroka), published in McGraw-Hill Book Company, New York, 1954 (pages 10–12 and 23–24 relied on).